United States Patent
Zhang et al.

(10) Patent No.: US 9,897,416 B2
(45) Date of Patent: Feb. 20, 2018

(54) PHOTOELECTRIC SIGHTING DEVICE

(71) Applicant: Huntercraft Limited, Albany, NY (US)

(72) Inventors: Lin Zhang, Albany, NY (US);
Chunhua Shi, Albany, NY (US); Sang Su, Albany, NY (US)

(73) Assignee: HUNTERCRAFT LIMITED, Albany, NY (US)

( * ) Notice: Subject to any disclaimer, the term of this patent is extended or adjusted under 35 U.S.C. 154(b) by 0 days.

(21) Appl. No.: 14/979,067

(22) Filed: Dec. 22, 2015

(65) Prior Publication Data
US 2017/0176144 A1 Jun. 22, 2017

(51) Int. Cl.
*F41G 3/06* (2006.01)
*F41G 3/16* (2006.01)
*H04N 5/77* (2006.01)
*F41G 3/08* (2006.01)
*F41G 3/32* (2006.01)

(52) U.S. Cl.
CPC ............. *F41G 3/165* (2013.01); *F41G 3/06* (2013.01); *F41G 3/08* (2013.01); *F41G 3/32* (2013.01); *H04N 5/772* (2013.01)

(58) Field of Classification Search
CPC .................... F41G 3/06; F41G 3/165
See application file for complete search history.

(56) References Cited

U.S. PATENT DOCUMENTS

| 9,025,040 B2* | 5/2015 | Thyssen | H04N 5/23258 235/404 |
| 2014/0184476 A1* | 7/2014 | McHale | G02B 27/017 345/8 |
| 2014/0360081 A1* | 12/2014 | Lupher | F41G 1/38 42/120 |

* cited by examiner

*Primary Examiner* — Stephen Johnson
(74) *Attorney, Agent, or Firm* — Novick, Kim & Lee, PLLC; Allen Xue

(57) ABSTRACT

The present invention relates to the technical field of sighting, and specifically relates to a photoelectric sighting device capable of indicating shooting in advance and having high shooting accuracy. The sighting device comprises a field-of-view obtaining unit for acquiring image information within a field of view of the sighting device; a display unit, for displaying reticle center and the image information acquired by the field-of-view obtaining unit; a control unit, for determining a target object in the image information and a target point of the target object while indicating shooting in advance; a power supply for supplying power for the photoelectric sighting device. The invention applies shooting indication in advance, so as to avoid a shooter from missing the best shooting time further to improve shooting accuracy.

20 Claims, 11 Drawing Sheets

PHOTOELECTRIC SIGHTING DEVICE

TECHNICAL FIELD

The present invention relates to the technical field of sighting, and more specifically relates to a photoelectric sighting device capable of indicating shooting in advance and having high shooting accuracy.

BACKGROUND

Since electronic sighting device and photoelectric sighting device can be integrated with multiple types of sensors, with the data of the sensors being comprehensively processed to be used in shooting assistance and provided for the shooter to improve the accuracy of shooting effectively, traditional mechanical sighting device and optical sighting device have been replaced by electronic sighting device and photoelectric sighting device in the prior art.

However, although in the process of shooting, multiple sensors provide effective assistance information to improve shooting accuracy, shooters still cannot shoot accurately, frequently because they cannot control a gun stably to miss the best shooting time or best shooting point, or because they apply a force on the trigger to cause an offset of the gunpoint.

SUMMARY OF THE INVENTION

In order to solve the above problems effectively, the present invention provides a photoelectric sighting device capable of indicating shooting in advance and having high shooting accuracy, which indicates a user to shoot when it is located in a certain range and direction of a target point of a target object, so as to improve shooting accuracy.

The invention also provides a calibration method of sighting device, combined with the photoelectric sighting device, such that a user calibrates a firearm before shooting.

The present invention provides a photoelectric sighting device capable of indicating shooting in advance and having high shooting accuracy, the sighting device comprises a housing, defining an accommodation space with all of a field-of-view obtaining unit, a display unit, and a control circuit disposed therein; the sighting device can simultaneously display a sighting point and an optical image acquired by the field-of-view obtaining unit on the display unit; the control unit determines a target object in the optical image, and a target point of a sighted object, and during the sighting process of the sighting point moving toward the target point, shooting advance indication is realized.

Further, the control unit is provided therein with an image marginalization processing unit, a target point acquisition unit and a shooting advance indication unit, wherein the image marginalization processing unit performs marginalization processing to objects in the optical image, such that a target object is selected by user's operation to the sighting device; the target point acquisition unit determines the target point of the target object and the shooting area of corresponding target point; and the shooting advance shooting unit indicates shooting in advance in the process of sighting.

Further, the shooting advance indication unit judges whether to indicate or not by the distance from the sighting point and the shooting area and the motion tendency of the sighting point.

The control unit is connected with a trigger assembly through wireless/wired connection device, the trigger assembly limits the movement of the trigger, so that a user cannot pull the trigger to shoot, and the trigger assembly stops the limitation to the trigger after it receives a shooting indication signal emitted by the control unit, to allow the user to shoot.

Further, the photoelectric sighting device having high shooting accuracy also comprises a range finding unit including a signal emission end and a signal reception end, the field-of-view obtaining unit comprises an optical image acquisition end, all of the signal emission end, the signal reception end and the optical image acquisition end are disposed at the front end of the housing, the signal emission end and the signal reception end are symmetrically distributed on upper side of the optical image acquisition end, and the plane formed by the optical image acquisition end forms an angle with the vertical plane of the gun.

Further, both the signal emitting end and the signal receiving end project above the optical image obtaining end.

Further, the signal emitting end and the signal receiving end are disposed at an upper end or a lower end of the optical image obtaining end.

Further, the front end of the housing is also provided with a protection unit.

Further, the photoelectric sighting device further comprises three field-of-view regulating units (which are key on the display unit, key provided on the housing and key connected to the housing, respectively).

Further, at the rear end of the housing is provided the display unit, the accommodation space of the housing is provided therein with the control unit and a battery pack (power supply), the field-of-view obtaining unit and the display unit are connected through the control unit, the control unit comprises a sensor module including a sensor group of other sensors besides a motion sensor, and the other sensors may be a wind speed wind direction sensor, a geomagnetic sensor, a temperature sensor, an air pressure sensor, a humidity sensor, vibration sensor, etc.; and the battery module supplies power to power units in the sighting device.

Further, on the housing is provided a key unit, the key unit comprising an external key assembly and a socket assembly, the external key assembly being provided at a place facilitating the user to use and touch, the socket assembly being connected to the external key assembly through an external connection line, the external key assembly being connected with a secure clip and fixed via the secure clip to a position of a barrel or gun facilitating the user to touch, the key unit being connected onto the control unit.

Further, the control unit comprises a interface board and a core board, where a field-of-view driving circuit of the field-of-view obtaining unit, a ranging control circuit in the range-finding unit, a key control circuit in the key unit, and a battery control circuit of the battery assembly are all connected onto the core board through the interface board, and a display driving unit of the display unit is connected onto the core board.

Further, the memory card is provided therein with a bullet information data base and two ballistic calculation model systems; a user can select the two ballistic models according to sensor setting, and each of the ballistic models may be a six-degree-of-freedom rigidity model or a low trajectory ballistic model.

Further, the present invention also provides a calibration method for realizing accurate shooting in the process of shooting with a sighting device, which is applied in the sighting device in above embodiments, the calibration method comprises: setting an objective target in the field-of-view of the sighting device, measuring to obtain the distance from the sighting device to the objective target through a range finding unit of the sighting device; calling a horizontal coordinate through a key unit and loading it on a display unit, applying the coordinate center to sight; observing the field-of-view of the display unit, controlling a gun, to align the coordinate center with the objective target; after aligning, emitting a first bullet to obtain a first impact point on the objective target, allowing the display unit to intercept an image with the first impact point; and adjusting the field-of-view of display screen of the sighting device, such that the center of the horizontal coordinate is coincident with the first impact point; achieving calibration.

Further, the calibration method may also possibly comprise adding a simulated calibration prior to a first shooting calibration, the simulated calibration simulating an impact point through the ballistic models.

Further, the calibration method may further comprise adding a second shooting calibration after the first shooting calibration, so as to enhance the preciseness of calibration.

In conjunction with the accompanying drawings, features of the present invention will be described in more detail in the following detailed depiction of various embodiments of the present invention.

DETAILED DESCRIPTION OF THE EMBODIMENTS

In order to make the objective, technical solution, and advantages of the present invention more elucidated, the present invention will be described in more detail with reference to the accompanying drawings and embodiments. It should be understood that the preferred embodiments described here are only for explaining the present invention, not for limiting the present invention.

On the contrary, the present invention covers any replacements, modifications, equivalent methods and solutions defined by the claims within the spirit and scope of the present invention. Further, in order to make the public understand better the present invention, some specific detailed portions are elaborated in the following depiction of the details of the present invention.

The invention provides a photoelectric sighting device capable of indicating shooting in advance and having high shooting accuracy, the sighting device having high shooting accuracy can be mounted on multiple types of sporting gun, and can also be mounted on other types of firearms. When the inventive photoelectric sighting device having high shooting accuracy is mounted on a gun, it is mounted through an installer with a known type in the prior art; specifically, the installer can be adapted to mounting rails or receiving devices of different types of guns, and achieves the adaptation through an adjustment mechanism included thereon, after the mounting is completed, the sighting device may be calibrated applying calibration method of the gun and gun sight or calibration device.

Figure 1:
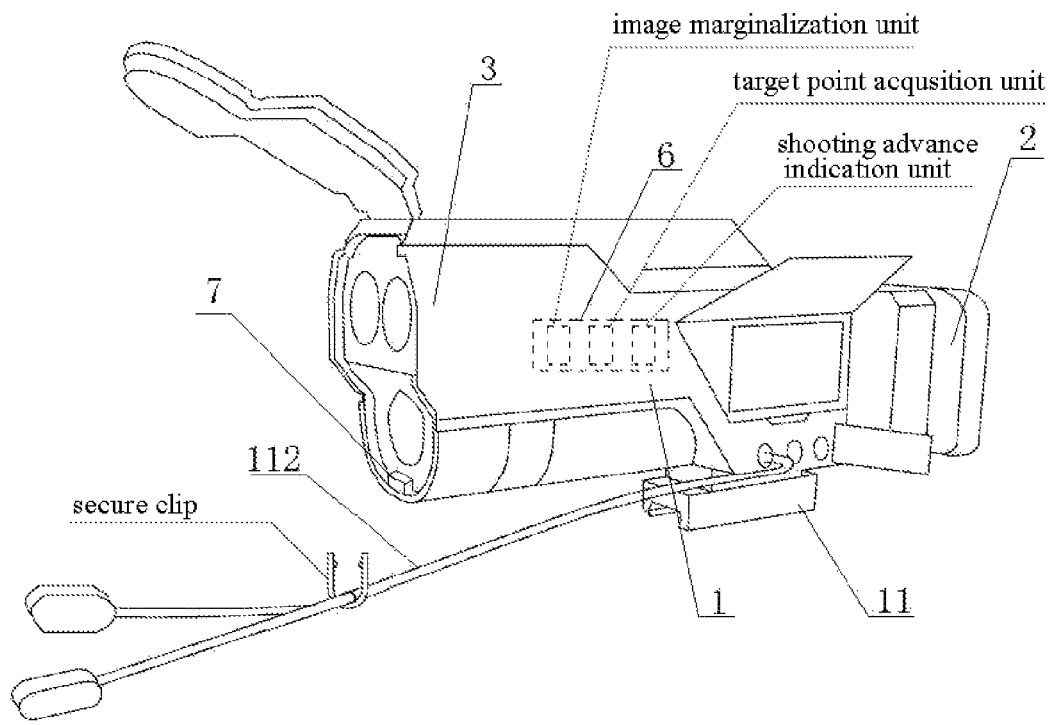
FIG. 1 shows a diagram of external view of a photoelectric sighting device in an embodiment of the present invention.

As shown in FIG. 1, a photoelectric sighting device having high shooting accuracy provided in an embodiment of the present invention, comprises a housing 1 determining the size of the entire photoelectric sighting device, the housing 1 defines an accommodation space accommodated therein with field-of-view obtaining unit 31, display unit and control unit 6; the field-of-view obtaining unit 31 is mounted at the inner side of the front end 3 of the housing, display unit is mounted at the inner side of the rear end 2 of the housing, and the field-of-view obtaining unit 31 is connected with the display unit through the control unit 6.

The field-of-view obtaining unit 31 collects the image information in the field of view, and transmits the image information to the display unit for display through the control unit 6; the display unit displays the image information and reticle center simultaneously, the reticle center is always in the central position of the display unit; the user performs sighting through the reticle center, specifically aligning the reticle center with the target in the image information, and then shoots.

Figure 2:
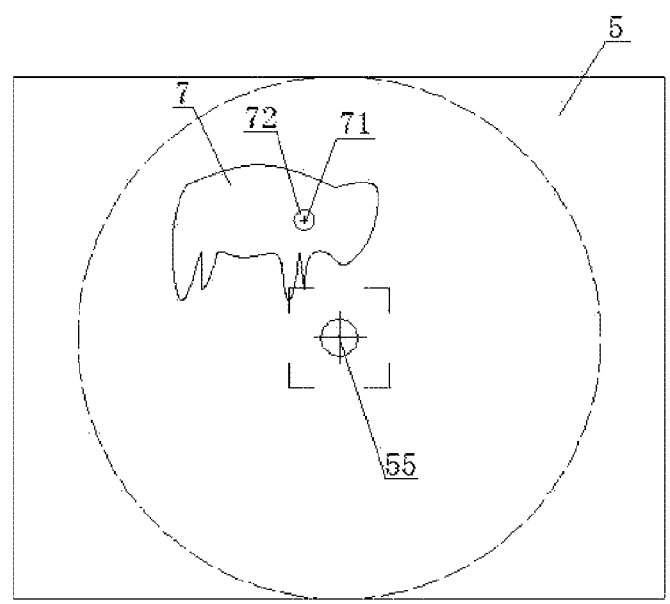
FIG. 2 shows an interface diagram of shooting advance indication of a photoelectric sighting device in an embodiment of the present invention.
Figure 3:
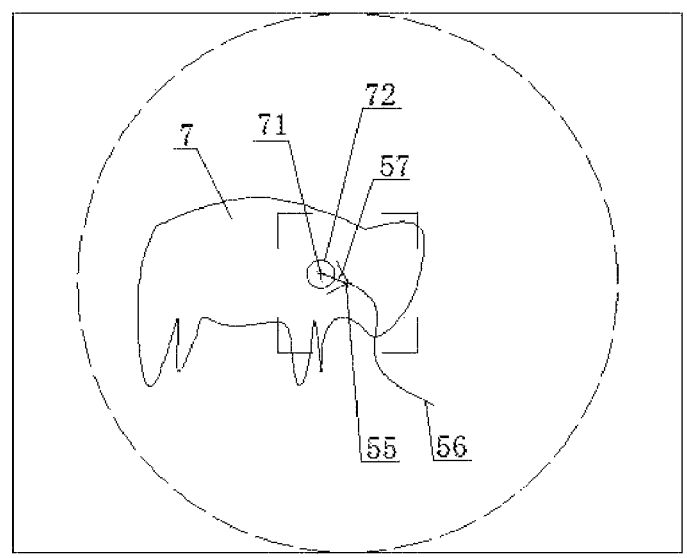
FIG. 3 shows an interface diagram of another shooting advance indication with sighting track of a photoelectric sighting device in an embodiment of the present invention.

As shown in FIG. 2, the embodiment in the invention provides a sighting device, which, in case of shooting, indicates shooting in advance in the process of applying reticle center 55 displayed by the display unit to approach a sighted object 7, specifically, before the reticle center 55 is coincident with target point 71 or arrives the shooting area 72 of target point 71, the sighting device provides a shooting indication to shooter by the display unit, or feed the shooting indication back to trigger assembly of a gun to make the trigger assembly allow shooting. By applying the shooting advance indication, the inventive sighting device can make the shooter avoid missing the best shooting time, to thereby improve shooting accuracy.

In the process of shooting, the image information acquired by field-of-view obtaining unit 31 it is transmitted to control unit for processing, and shooting indication is provided after the processing; specifically, the control unit is provided therein with an image marginalization processing unit, a target point acquisition unit and a shooting advance indication unit, wherein, the image marginalization processing unit and the target point acquisition unit performs processing to the image information to obtain a target point beneficial to shoot, and the shooting advance indication unit provides a shooting indication through comparison judgment of the target point and sighting point.

Wherein, the image marginalization processing unit performs edge detection and extraction to any-frame image of the image information, optionally three-frame image selected in an embodiment;

The edge detection and extraction comprises the following steps: firstly, performing smoothing to image f(x,y) by use of Gaussian function to obtain a smoothed data array:

$$S(x,y)=f(x,y)*G(x,y,\sigma)$$

wherein σ is scatter parameter reflecting smoothing degree.

Secondly, gradient computation is performed, wherein gradient of the smoothed data array S(x,y) may be obtained through two arrays P(x,y) and Q(x,y) calculating x and y partial derivative by use of 2×2 first-order finite difference approximant.

$$P(x, y) \approx \frac{(S(x, y+1) - S(x, y) + S(x+1, y+1) - S(x+1, y))}{2}$$

$$Q(x, y) \approx \frac{(S(x, y) - S(x+1, y) + S(x, y+1) - S(x+1, y+1))}{2}$$

The following formulas are used to solve mean value of finite difference in 2×2 square and calculate partial derivative gradient of x and y, magnitude and azimuthal angle of the same point in the image $$M(x,y)=\sqrt{P(x,y)^2+Q(x,y)^2}$$

$$\theta(x,y)=\arctan(Q(x,y)/P(x,y))$$

In the formulas, the arctan function contains two parameters, the calculation result is an angle with value range of circumference range.

When gradient direction θ(x,y) is obtained, the edge direction can be partitioned by 45° into eight directions, and adjacent pixels of this pixel gradient direction will be obtained by the gradient direction.

To ensure accurate edge positioning and keep single corresponding, thinning of roof ridge-like belt in the gradient magnitude image M(x,y) is performed to remain the point with maximum magnitude local variation. In the process of non-maximum suppression, for every point m(x,y) of the image and the gradient direction obtained in the previous step, the point m(x,y) is compared with two gradient magnitudes in the gradient direction; if m(x,y) is smaller than two gradient magnitudes in the gradient direction, the point is determined as not the point with maximum magnitude local variation, and the edge corresponding to m(x,y) is indicated as 0, namely this point is not an edge point.

Dual-threshold detection, and a low threshold Lth and a high threshold Hth required by edge connection, are set, dual-threshold processing is performed to the gradient image, a pixel with gradient magnitude greater than the high threshold Hth is the edge pixel, a pixel with gradient magnitude less than the low threshold Hth is not the edge pixel, when the gradient magnitude of a pixel is less than the high threshold Hth and higher than the low threshold Lth, it is judged whether there is edge pixel with the gradient magnitude greater than the high threshold Hth in the eight-direction pixels of the pixel, and if there is, the pixel is an edge pixel, otherwise, the pixel is not an edge pixel. After an edge point is determined, it is performed to continuously search and follow the edge until the edge points are connected, the edge of the entire image is extracted, and by the extracted edge, it is performed to partition the image in the image information to realize separation of the target object from background.

The above processing process realizes marginalization processing of all selected-frame images, therefore, the corresponding edges of all the objects and units in the image information are obtained, the sighting device performs marking to every object with an edge including the sighted object, such that users select the marked sighted object;

The selection operation of the marked sighted object may be realized by clicking on the display unit with touch function, or clicking a key provided on the housing, or clicking an external key connected onto the housing.

After the sighted object is selected, the target point acquisition unit obtains the image of the sighted object with an edge and acquires a best shooting point thereof, namely the target point.

The method of acquiring the best shooting point of the image of the sighted object comprises: disassembling graph of irregular target object into multiple simple basic graphs, wherein flexural edge becomes similar to straight line after disassembling; and according to the center position and area of each basic graph and using the calculation formula below, solving the target point of the image of the sighted object. The formula is:

$$x_c = \frac{\sum A_i \cdot x_i}{A}$$

$$y_c = \frac{\sum A_i \cdot y_i}{A}$$

wherein, the $A_i$ is the area of each graph, $x_i$, and $y_i$, are x-direction and y-direction coordinates of the center of each basic graph respectively, and $x_c$, and $y_c$, are the target point of the image of the sighted object, which is affirmed as the best shooting point.

After determining the best shooting point, the best shooting point is kept pace with the target object, namely during moving process of the field-of-view obtaining unit 31 of the sighting device, the best shooting point is always positioned in the image of the sighted object.

The shooting advance indication unit provides indication by judging the distance from sighting point 55 (reticle center) to target point 71 and movement tendency, after acquiring the determined image of the sighted object 7 and target point 71 (best shooting point).

A circle with the target point 71 as the center and r as radius is shooting area 72, the size of r is not specifically defined, the area of the shooting area 72 obtained by r is defined as s, the area of the image of entire sighted object 7 is S, the relation of s and S meets 0.02≤s/S≤0.1, and any shooting in the shooting area 72 can hit the sighted object accurately.

The shooting advance indication unit acquires the position relationship of reticle center 55 and shooting area 72 simultaneously, as well as corresponding least distance L from the reticle center 55 to the boundary of the shooting area 72, the distance L is the length value of the distance displayed on the display unit, and in case of L≤r/2, the shooting advance indication unit acquires the movement tendency of the reticle center as well to judge whether to indicate shooting.

In the shooting process, user's body trembling and unstable holding of a gun will result in slight vibration of the gun, which will cause the bullet to deviate from the target point seriously in long-range shooting to make the shooting inaccurate, therefore, the invention, in case of indicating shooting in advance, acquires the movement tendency of the field-of-view obtaining unit 31 of the sighting device, which includes movement direction of the field-of-view obtaining unit 31, and further to judge whether to indicate shooting by combination of the movement direction and the distance L. When the value range of angle α formed by the movement direction with the straight line of the sighting point and the target point is −45°≤α≤+45°, and the distance L meets L≤r/2, a shooting indication is provided.

The movement direction of the field-of-view obtaining unit 31 of the sighting device is obtained by a motion sensor 7 disposed at the lower side of the field-of-view obtaining unit 31, the motion sensor 7 acquires the movement data of the field-of-view obtaining unit 31 in real time, the motion sensor 7 is an inertial sensor comprising therein an accelerometer, an angular velocity transducer and their single-axis, dual-axis and three-axis combination inertia measurement unit, the inertial sensor realizes measurement of movement direction and movement velocity of the field-of-view obtaining unit 31 via the integrated measurement unit.

The invention also provides a trigger assembly (not shown in Figures) connected with the photoelectric sighting device, the trigger assembly comprises a trigger, a limitation device for limiting the trigger and a signal reception device for receiving the shooting advance indication signal emitted by the photoelectric sighting device, the signal reception device controls the limitation device to open and shut, after the signal reception device receives a shooting advance indication signal, the limitation device will be shut down to stop limitation of the trigger, such that a shooting can be performed, and if the signal reception device does not receive a shooting advance indication signal, the limitation device will be opened to keep limitation of the trigger, such that users cannot pull the trigger to shoot.

The limitation device is an elastic fixture block, which is clamped below the trigger in an open status to prevent the trigger from being pulled, and is contracted below the trigger in a shut-down state to allow the trigger to be pulled freely to achieve shooting.

The entirety of the inventive photoelectric sighting device may be a digitalizer capable of communicating with smart phones, smart terminals and sighting device or circuit to send the image information acquired by the field-of-view obtaining unit 31 to the smart phones, smart terminals and sighting device or circuit, and the image information acquired by the field-of-view obtaining unit 31 is displayed by the smart phones, smart terminals, etc.

In one embodiment, the field-of-view obtaining unit 31 may be an integrated video camera, the amplification factor of lens may be selectively varied as practical use, the integrated video camera employed in the present invention is 3-18X video camera manufactured by Sony, but not limited to the type and amplification factor, the integrated video camera is disposed at the most front end of the photoelectric sighting device, and the front end of the integrated video camera is equipped with UV lens and a lens cap 34, and the lens cap 34 can realize 270° turnover to completely cover the front end of the housing, so as to protect the field-of-view obtaining unit 31 from damage and protect the lens, and is convenient for cleaning.

Figure 4:
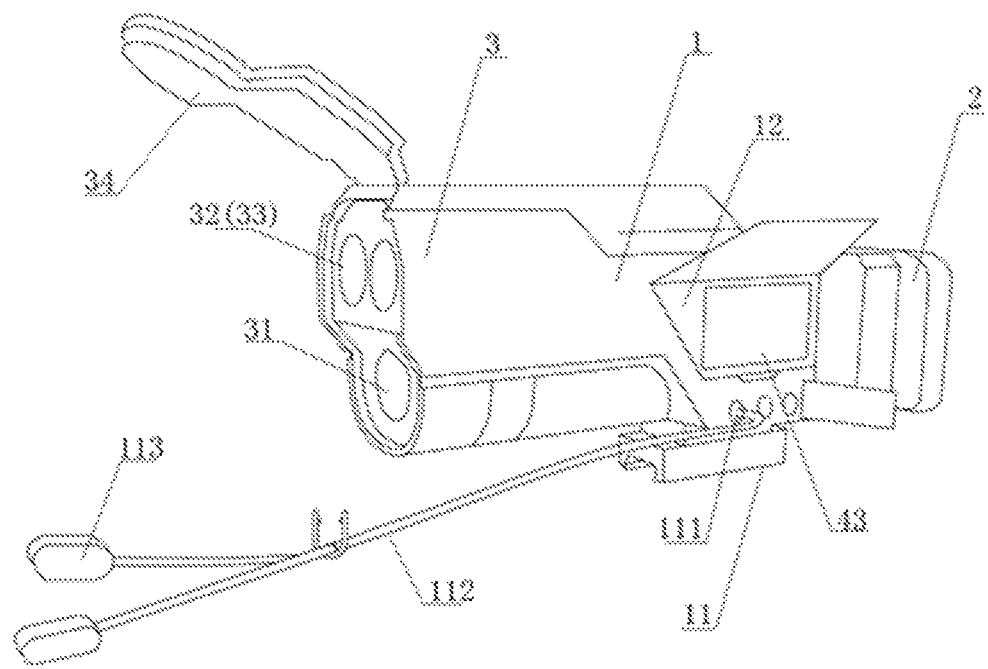
FIG. 4 shows an overall structural diagram of a photoelectric sighting device in an embodiment of the present invention.
Figure 5:
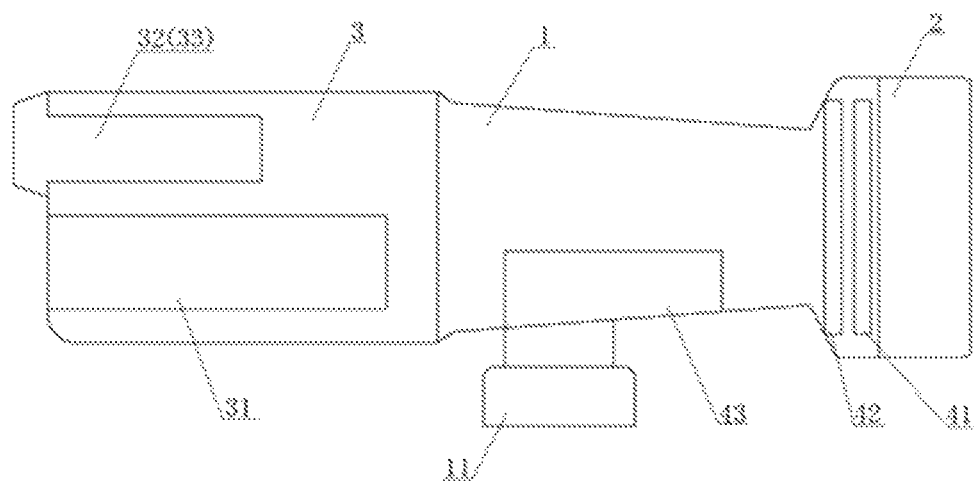
FIG. 5 shows a structural sectional view of a photoelectric sighting device in an embodiment of the present invention.
Figure 6:
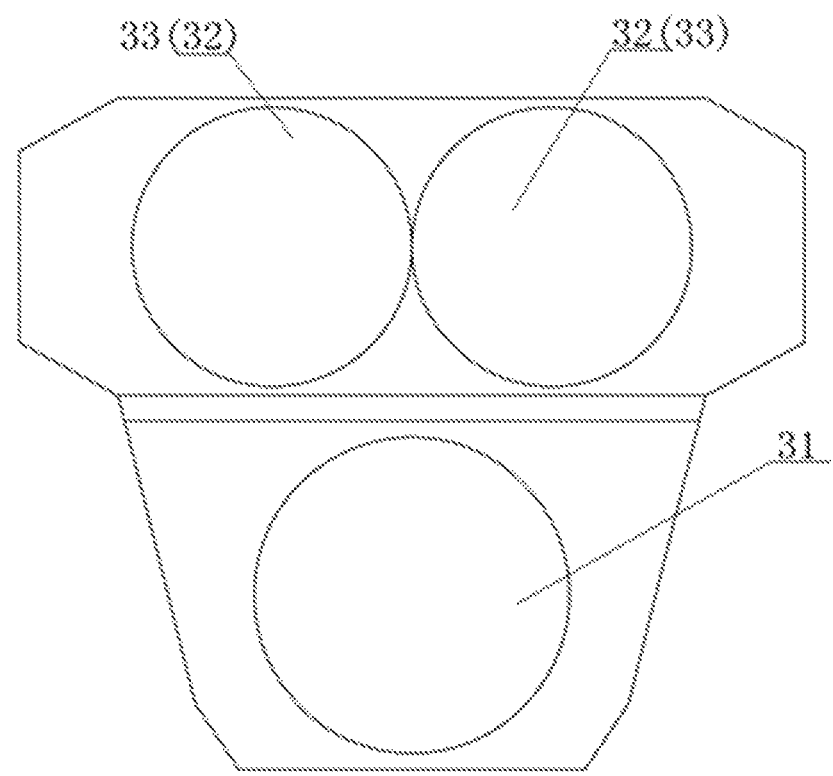
FIG. 6 shows a diagram of a front end of a housing of a sighting device in an embodiment of the present invention FIG. 7 a system block diagram of a photoelectric sighting device in an embodiment of the present invention.

As shown in FIGS. 4-6, in the above embodiments, the photoelectric sighting device comprises a range finder, the range finder is a laser range finder disposed within the housing 1, and the laser range finder is a pulsed laser range finder. The laser range finder comprises a laser emission end 32 and a laser reception end 33, both provided at the front end of the housing 1 and distributed symmetrically at the upper side of the camera head of the integrated video camera, the laser emission end 32, the laser reception end 33 and the camera head of the integrated video camera forms an inverted equilateral triangle or an inverted isosceles triangle; both the laser emission end 32 and the laser reception end 33 are projected above the front end of the housing 1, there are certain height difference among the laser emission end 32, the laser reception end 33 and the camera head of the integrated video camera, and both the laser emission end 32 and the laser reception end 33 are projected above the front end 3 of the housing, such design lessens the occupied space of the laser range finder within the housing, the overlong parts of the laser emission end 32 and the laser reception end 33 are projected outside the front end 3 of the housing, to realize high integration of the interior space of the housing 1, such that the photoelectric sighting device is more small, flexible and portable; besides, objective lens thickness of the field-of-view obtaining unit 31 is greater than the lens thicknesses of the laser emission end and reception end, therefore, laser range-finding error is reduced through this design.

The lens cap 34 as mentioned in the above embodiment may cover the field-of-view obtaining unit as well as the front end of the laser range-finder, so as to protect the laser range-finder from being damaged.

The laser emission end 32 is provided therein with a laser source, emitting one or more laser beam pulses to the field of view of the photoelectric sighting device, under control of the control unit or core board of the photoelectric sighting device, the laser receiving end 33 receives a reflective beam of one or more laser beam pulses, and transmits it to the control unit or core board of the photoelectric sighting device; the laser emitted by the laser emitting end 32 is received by the laser receiving end 33 after being reflected by the measured object. The laser range-finder simultaneously record the round-trip time of the laser beam pulse. A half of a product of the light velocity and round-trip time is the distance between the range-finder and the measured object.

Working principle of the laser range finder in above embodiment is: allowing drive circuit to drive the laser source in the laser emission end 32 to emit a pulsed laser signal; allowing a little part of the pulsed laser signal to pass reflecting mirror to be sampled and used for opening gating circuit; allowing counter to start counting the clock pulses of reference signal; allowing the remaining pulsed laser signal to be emitted to to-be-detected object, reflected by the to-be-detected object, received by photoelectric detector, amplified and shaped to form electric signal; and shutting down the counter to achieve one-time counting. The distance from the to-be-detected target object is obtained as:

$$L = \frac{cN}{2f_0}$$

wherein $f_0$ is pulse frequency of reference clock, N is number of counted pulses; it can be realized by the above formula that:

The laser range-finder according to the embodiments of the present invention adopts a semiconductor laser with a work wavelength of 905 nanometer or 1540 nanometer. First, it avoids damage to the human body by the laser; meanwhile, the photoelectric detector can accurately determine the start and end points of the laser pulse and accurately measure the flying time of the laser. By controlling the frequency of the reference clock pulse above 1.5 GHz, error will be reduced.

The control unit disposed within the housing 1 for connecting the field-of-view obtaining unit 31 and the display unit comprises a CPU core board 41 and an interface board 42. The interface board 42 is connected to the CPU core board 41. Specifically, the input and output of the CPU core board 41 are connected through a serial port at a bottom side of the interface board 42, and the CPU core board 41 is disposed at one side of the display unit display screen relative to the inside of the housing 1. The interface board 42 is disposed at one side of the CPU core board 41 opposite to the display screen. The display screen, CPU core board 41, and the interface board 42 are disposed parallel to each other. The integrated video camera and the range-finder are connected to the interface board 42 through a wiring. The image information obtained by the integrated video camera and the distance information obtained by the range-finder are transmitted to the CPU core board 41 through the socket board 42, and then the information is displayed on the display screen via the CPU core board 41.

The CPU core board 41 may be connected to a memory card via the interface board 42 or directly connected to the memory card. In the embodiments of the present invention, a memory card slot is provided at a top position of the CPU core board 41. The memory card is plugged into the memory card slot. The memory card may store information. The stored information may be provided to the CPU core board 41 for calculation of a ballistic equation. The memory card may also store feedback information transmitted by the CPU core board 41.

A USB interface is also provided at the memory card slot edge side at the top of the CPU core board 41. Through the USB interface, information from the CPU core board 41 may be outputted, or the software program disposed within the CPU core board 41 may be upgraded and optimized.

Figure 7:
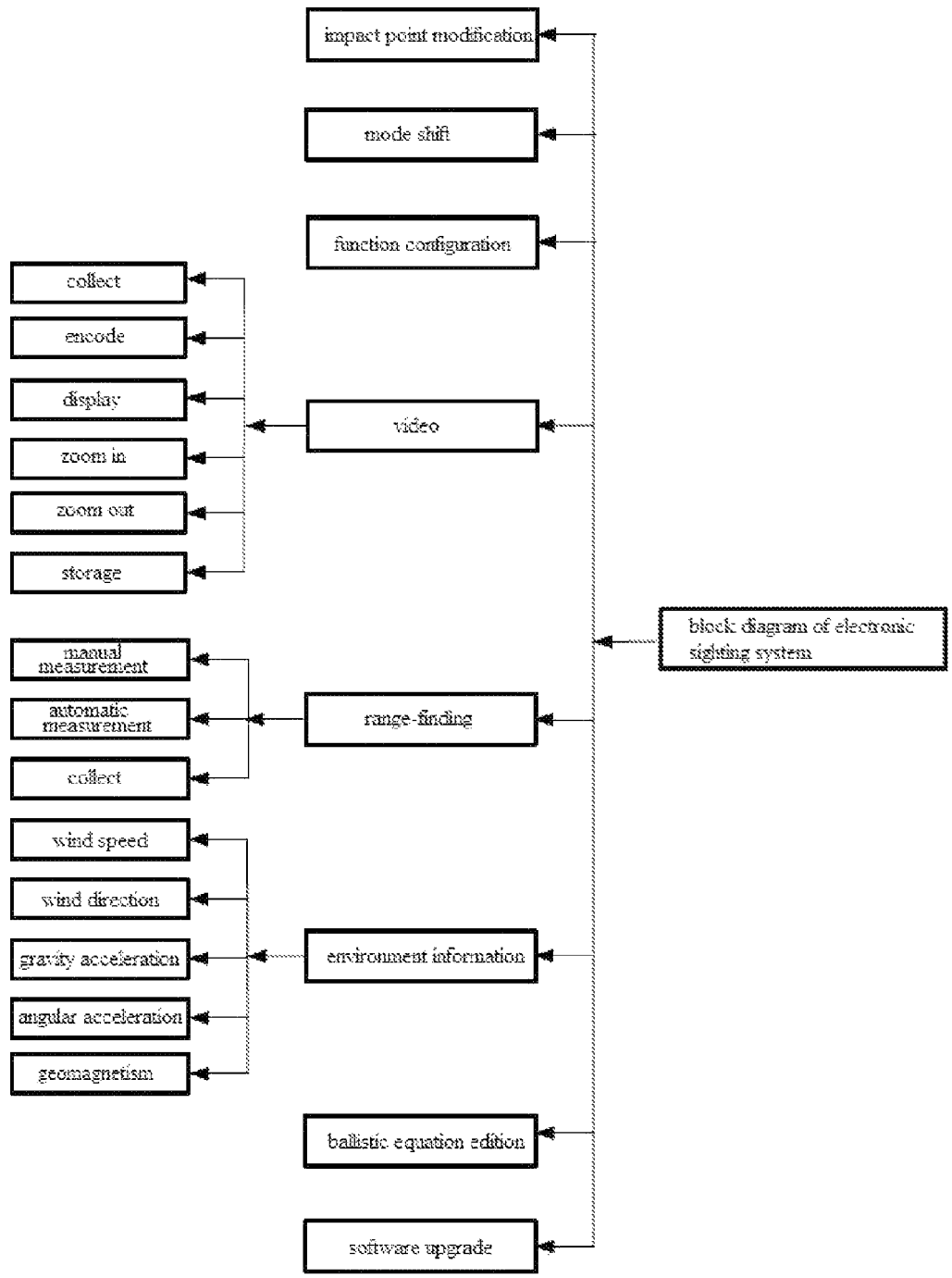
Figure 8:
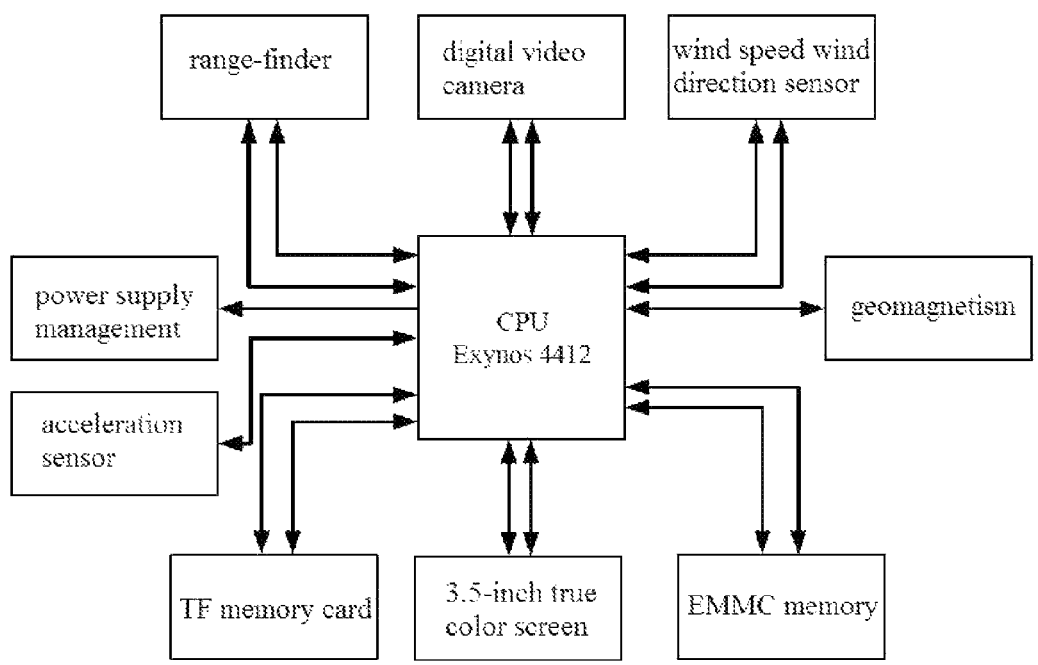
FIG. 8 shows a structural diagram of a sensor module of a photoelectric sighting device in an embodiment of the present invention

As shown in FIGS. 7-8, the photoelectric sighting device also comprises multiple other types of sensors besides the motion sensor, specifically including several or all of a wind speed wind direction sensor, a geomagnetic sensor, a temperature sensor, an air pressure sensor and a humidity sensor (acquiring different sensor data according to selected ballistic equations); in one embodiment, motion sensor and geomagnetic sensor are integrated on CPU core board 41; and in one embodiment, the motion sensor is a chip MPU-6050 integrated with gyroscope and accelerometer, the geomagnetic sensor is three-axis magnetometer MAG3110, and the wind speed wind direction sensor is externally provided on the photoelectric sighting device and connected on the interface board 42. The temperature sensor, barometric sensor, and humidity sensor may be integrated on the CPU core board or connected onto the CPU core board through the interface board 42. All of the above sensors employ a 11C (or 12C, I²C) interface.

Within the housing 1 is also disposed a battery compartment 12. Within the battery compartment 12 is provided a battery assembly 43, within the battery compartment 12 is provided a slideway for plugging the battery assembly 43 in and out. The battery compartment 12 is disposed at a middle bottom side within the housing 1. Through a side edge of the housing 1, a battery compartment cover may be opened to change the battery assembly 43. In order to prevent slight deviation in battery size of the same model, a layer of sponge (or foam, bubble cotton) is provided at the internal side of the battery compartment cover. The sponge structure disposed at the internal side of the battery compartment cover may also prevent battery instability caused by shock from gun shooting.

A battery circuit board is provided at an upper side of the battery assembly 43. The battery assembly 43 supplies power to various elements of the photoelectric sighting device through the battery circuit board, and meanwhile the battery circuit board is connected to the CPU core board 41 via the interface board 42.

In one embodiment, the battery assembly 43 specifically employs a voltage of 7.2-7.4V; a capacity of 3900-5700 mAh; an electrical work of 28.08 Wh-42.2 Wh; and a weight of 100-152 g.

An external key is provide at the external side of the housing 1 close to the display unit. The external key is connected on the socket board 42 via a key control board at the internal side of the housing 1. By touching and pressing the external key, the information on the display unit may be controlled, selected and modified. The specific position of the external key is 5-10 cm away from the display unit.

The external key is specifically disposed to the right of the display unit. However, the specific position of the external key is not limited to the above position. Instead, it should be disposed at a position facilitating the user to use and press. The user controls the CPU core board 41 through the external key. The CPU core board 41 drives the display screen to display. The external key may control selection of a shooting target in a view zone displayed on the display unit, or control the photoelectric sighting device to start a laser range-finder, or control a video camera unit of the photoelectric sighting device to regulate the focal distance of the gun sight, etc.

In another embodiment, the key control board for the external key may be provided with a wireless connection unit, through which peripheral devices are connected. The periphery devices include a smart phone, a tablet computer, etc. then, program is loaded through the periphery devices, which may control selection of a shooting target in a view zone displayed on the display unit, or control the photoelectric sighting device to start a laser range-finder, or control a video camera unit of the photoelectric sighting device to regulate the focal distance of the gun sight, etc.

At the external side of the housing 1 is further provided an external slot 111. A portion of the external slot 111 disposed at the internal side of the housing is connected to the key control board. A portion of the external slot 111 disposed at the external side of the housing is connected to an external connection line 112. The external connection line 112 is connected to an external key 113 through which the user may control selection of a shooting target in a view zone displayed on the display unit, or control the photoelectric sighting device to start a laser range-finder, or control a video camera unit of the photoelectric sighting device to regulate the focal distance of the gun sight, etc.

The external connection line 112 may also be connected to other operating devices, or ancillary shooting devices, or video display devices; or information and video may be transmitted through the external connection line 112. All of the other operating devices comprise an external control key, a smart phone, a tablet computer, etc. One end of the external connection line 112 is socketed within the external socket slot 111; the other end is provided with a "U"-shaped clip. The external connection line 112 is clipped on the gun barrel through the "U"-shaped clip, thereby securing the external connection line 112 and preventing affecting shooting. In one embodiment, an operating device connected through the external connecting line 112 may select a target in the view zone, start a laser range-finder, or adjust a gun sight focal distance, etc.; the "U"-shaped clip provide simple and convenient zooming and focusing operations for a gun without a support.

The display unit is a LCD display. A touch operation may be implemented on the LCD display. The size of the display may be determined based on the actual needs. In the present invention, the display screen as adopted is sized to 3.5 inches.

In one embodiment, the LCD display screen has a resolution of 320*480, the work temperature is $-20\pm te°$ C., the backlight voltage is 3.3 v, and the voltage between the LCD screen and the GPU interface is 1.8 v; the touch screen is a capacitive touch screen.

Figure 9:
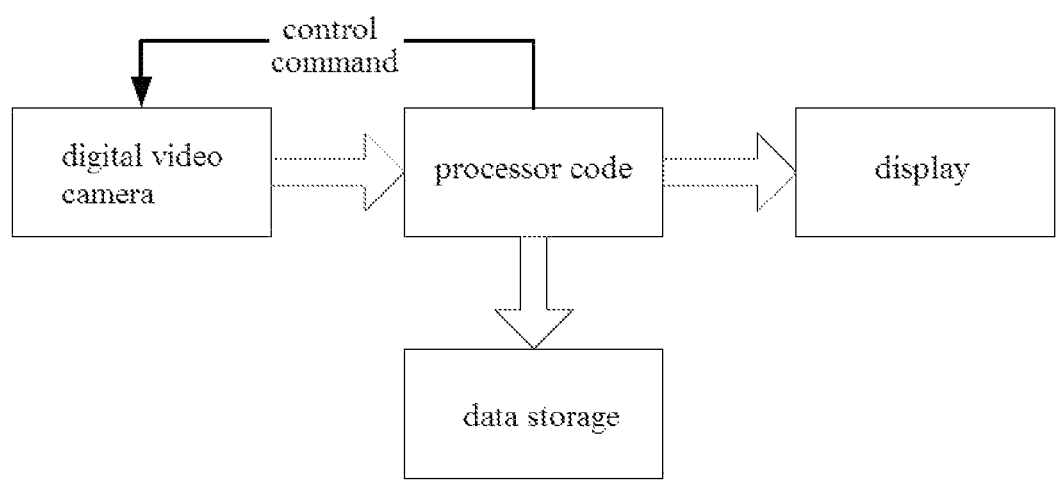
FIG. 9 shows a system diagram of field-of-view acquisition, storage, and feedback control of a photoelectric sighting device in an embodiment of the present invention.
Figure 10:
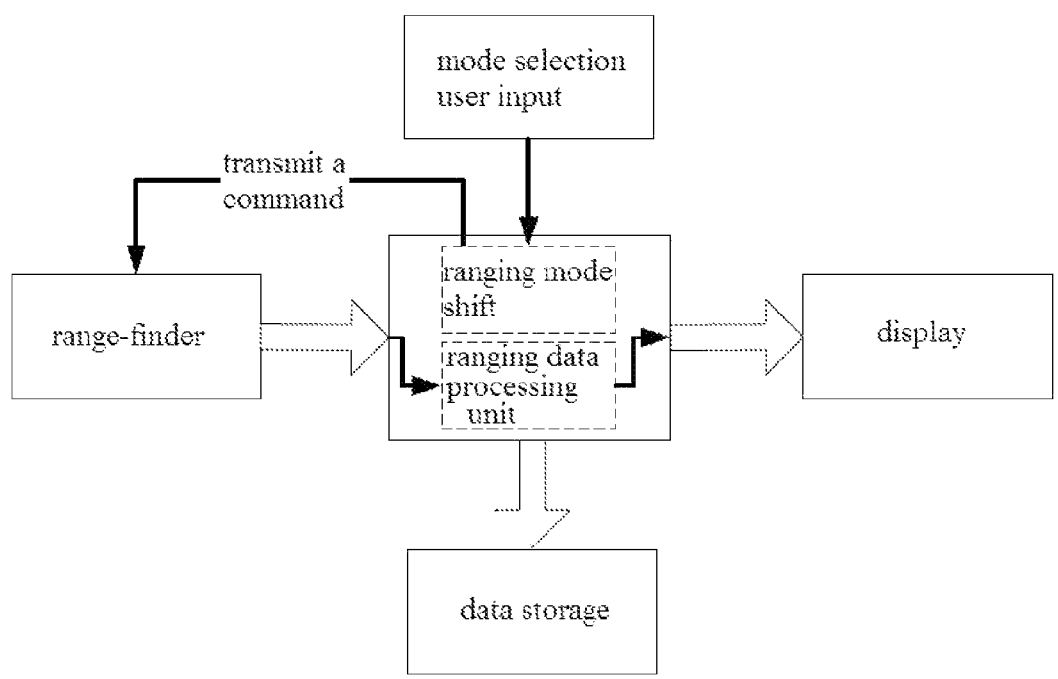
FIG. 10 shows an operation schematic diagram of a range finder of a photoelectric sighting device in an embodiment of the present invention.
Figure 11:
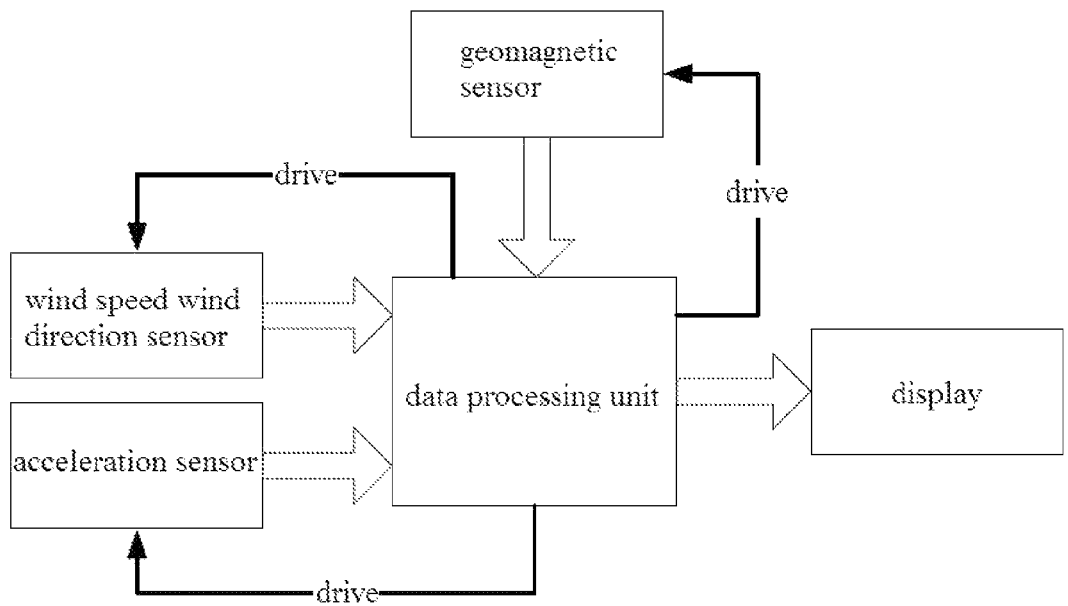
FIG. 11 shows an operation schematic diagram of a sensor module of a photoelectric sighting device in an embodiment of the present invention.

As shown in FIGS. 9-11, reticle central lines (sight bead) displayed on the display screen and the image information acquired by the field-of-view obtaining unit 31 are superposed with each other, reticle central lines are used for sighting of shooting, what is displayed on the display screen as well is shooting assistance information transmitted by the above mentioned various sensors or combination of several sensors and used for shooting assistance, and working indication information.

The ancillary shooting information includes environment information, distance information, and angle information;

The environment information includes wind speed data, temperature data, barometer data, and magnetic field data. The wind speed data is disposed at one end of the upper side of the display screen. The magnetic field data is disposed at a middle part of the lower side of the display screen. The temperature data and barometric data are disposed at the other end of the upper side of the display screen;

The distance information is disposed above the temperature data and barometric data;

The angle information includes the elevation angle data and azimuth angle data, where the elevation angle data is disposed beneath the wind speed data, while the azimuth angle data is disposed in the middle part of the upper side of the display screen.

The work indication information comprises battery level information, wireless signal information, remaining recording time, multiple information, shift key, and menu key;

The battery level information is disposed beneath the elevation angle data, while the remaining recording time, multiple information, and wireless signal information are disposed successively beneath the temperature data; the shift key and menu key are disposed at two ends of the lower side of the display screen.

The ancillary shooting information in the above embodiments are partially applied in a ballistic equation, and partially used for displaying to alert the user.

The photoelectric sighting device may also possibly comprise one or more ports and a radio transceiving unit. The one or more ports and radio transceiving unit may communicate with a smart phone or other terminal devices through a wired or wireless connection.

The other information includes Wi-Fi signal, battery, state shift key, menu key, remaining recording time, recording key, and current multiples. The LCD display screen provided by the present invention may perform shift between daylight/night work modes. The night work mode is implemented through infrared light compensation.

The photoelectric sighting device may also comprise a wireless transmission module. The wireless transmission module is connected to an external device through a wireless connection manner. The wireless transmission module will synchronously display the reticle, image and information displayed on the display screen to the external device;

The wireless connection manner is a WiFi connection or other wireless network connection, but not limited to these connection manners. The external device is a smart phone or other intelligent terminal device, etc.

Based on the structure of the above photoelectric sighting device, its CPU core board 41 is further connected with a memory card. Within the memory card, bullet information database and two ballistic calculation model systems are set. The user may select one of the two ballistic models based on the setting of the sensor. The ballistic models are an external ballistic 6-degree-of-freedom rigidity model and a low trajectory ballistic model, respectively. Through the two ballistic models, the photoelectric sighting device realizes a precise positioning.

In order to accurately predict the position of an impact point, the impact point is predicted using an external ballistic 6-degree-of-freedom rigidity model based on the data collected by various sensors and the bulletin data stored in the memory.

When a shot is flying in the air, the force and torque acting on the shot are mainly the acting force from the earth and aerodynamic force. Generally, the motion of the shot may be decomposed into center of mass motion and motion around the center of mass, which are described by momentum lar and law of moment of momentum.

In the 6-degree-of-freedom rigidity model, the shot in spatial movement is regarded as a rigidity. It considers three free degrees of the center of mass of the shot and three free degrees rotating around the center of mass. And all forces and torques acted on the shot are considered.

In the above model, the parameters that need to be input include: 1) atmospheric conditions: wind speed wind direction, temperature, air pressure, humidity; 2) shooting position: altitude and latitude, as well as elevation coordinates of the shooting point; 3) shooting condition: initial velocity and direction of the bullet outlet, wherein the direction is represented by the elevation angle and azimuth angle of the gun barrel; 3) bullet-target distance: obtained through a laser range-finder; 4) bullet data (stored in the database): mass of the shot, cross-section area of the shot, mass eccentricity (or rotational inertia), resistance coefficient, etc.

Figure 12:
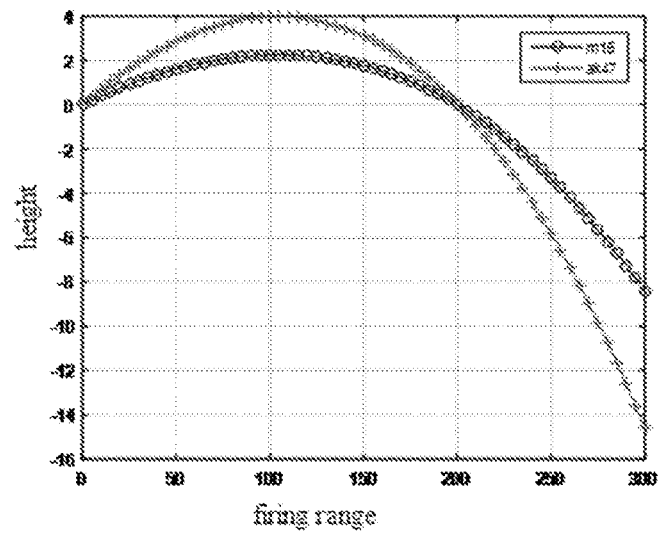
FIG. 12 shows a schematic diagram of ballistic simulation comparison for two types of bullets by a photoelectric sighting device in an embodiment of the present invention applying an external ballistic 6-degree-of-freedom rigidity model.
Figure 13:
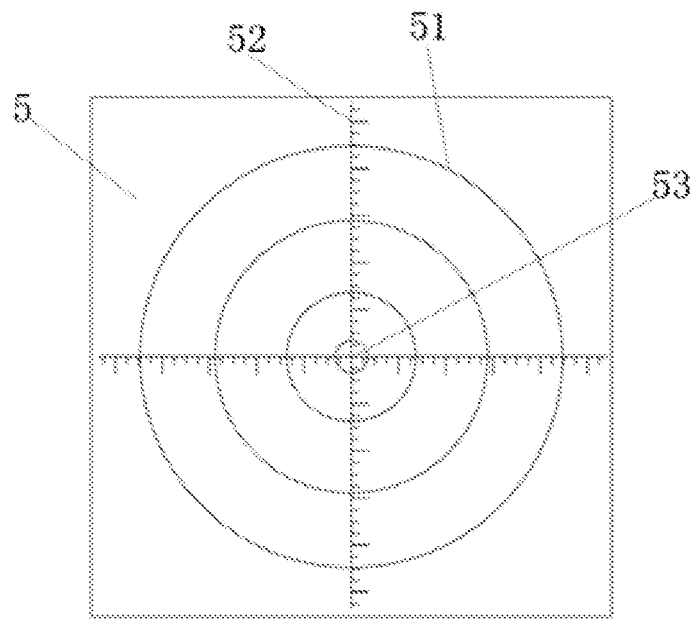
FIG. 13 shows a schematic diagram of a display screen before calibration in a calibration method of photoelectric sighting device in an embodiment of the present invention.
Figure 14:
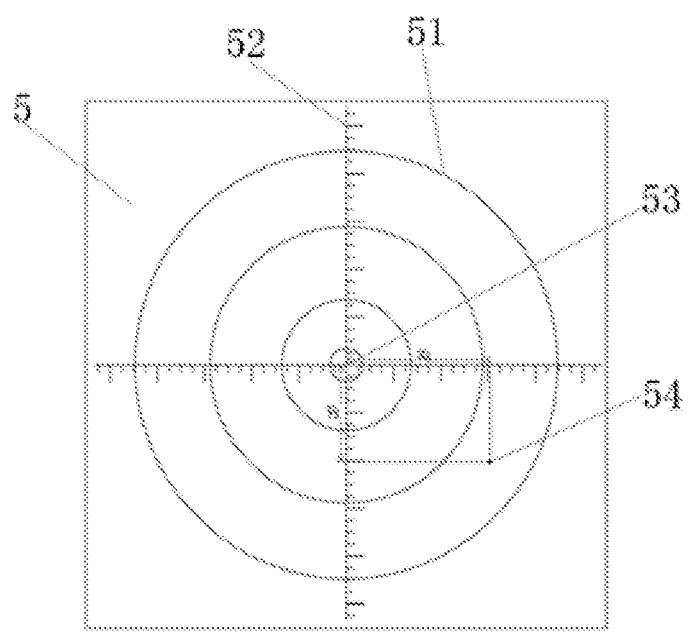
FIG. 14 shows a schematic diagram of a display screen with a first impact point in a calibration method of sighting device in an embodiment of the present invention.
Figure 15:
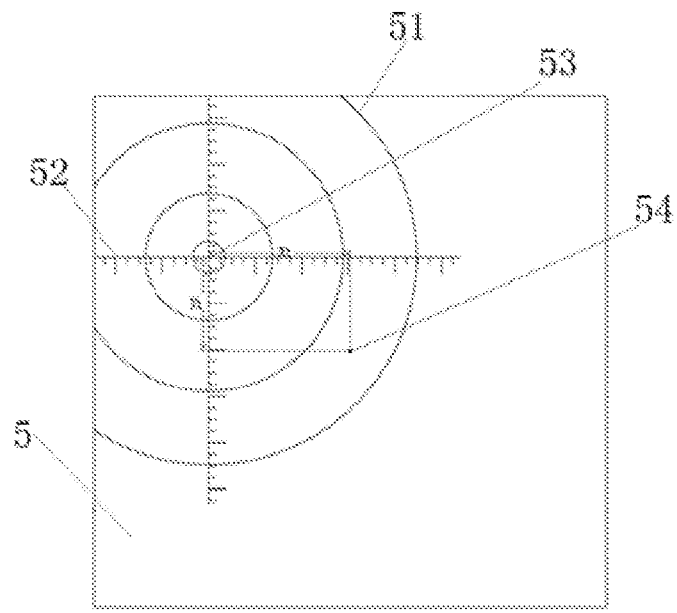
FIG. 15 shows a local enlarged view of FIG. 14 in an embodiment of the present invention.
Figure 16:
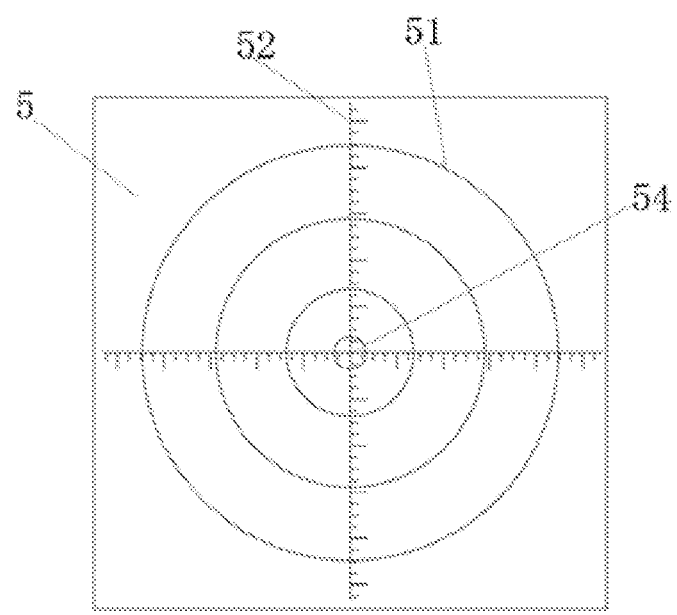
FIG. 16 shows a schematic diagram of a display screen after calibration for a first shooting in a calibration method of sighting device in an embodiment of the present invention.

FIG. 12 illustrates simulated calculations for a M16 233 Rem, 55 g, PSP shot and an AK47 (7.62×39 mm), 125 g, PSP shot. The simulation is performed only to vertical direction, and lateral direction is temporarily omitted. Supposed environment conditions: bullet-target distance 200 m, launching height 0.001 m, height 500 m, temperature 50 Fahrenheit degrees. It is seen from the figure that in order to shoot targets of a same distance, both initial launching heights are different; based on restriction conditions measured according to weather, the required launching height and launching direction are resolved; they may be regulated to hit a target at a certain distance.

In another scenario, if the wind force and wind speed are not high and the acting force of the lateral wind is very small, the low trajectory ballistic model is employed. In the low trajectory ballistic model, impacts from the low wind speed wind direction, temperature, air pressure, humidity might not be considered.

The low trajectory may be understood such that the arc variation of the bullet trajectory (i.e., parabola) approaches to a straight line. The closer to the straight line, the lower trajectory it is. Low trajectory ballistic calculation refers to ballistic calculation under a condition of small angle of fire; based on the feature that the resistance coefficient of a low-speed shot approximates a constant (specifically, for a low trajectory, under a standard weather condition, the air density function is approximately 1, the sound velocity is regarded as a constant; therefore, the resistance coefficient is a function of the bullet speed), external ballistic 6-degree-of-freedom basic equation may be simplified to resolve an equation of shooting elements of any point of the low-speed low trajectory, thereby finding a calculation method for resolving the shooting elements at the apex of the trajectory, the shooting elements at the impact point, and the point-blank range.

During the shooting process, some affecting objects (e.g., grass blown by wind) might exist to block the targeted object, thereby affecting the accuracy of the obtained range data. Therefore, in one embodiment, the laser range-finder of the photoelectric sighting device likely have a manual mode. The manual mode is specifically selecting a to-be-ranged target object on the display unit. The display unit feeds back the target object to the control unit. The control unit sets a flag to the target object and controls the laser range-finder to range the flagged target object. Only the range value of the flagged target object is read. Through the above manual ranging, the range value of the sighted object can be accurately measured, which avoids interference from other affecting objects. The control unit in the present embodiment is a CPU core board, or other unit or assembly that has an independent data processing capability.

The present invention also provides a calibration method for realizing accurate shooting in the process of shooting with a sighting device, which is applied in the sighting device in above embodiments for better achieving accurate shooting; the calibration method includes automatic simulation calibration and manual calibration.

The automatic simulated calibration comprises steps of:
1. setting a target within a field of view of the photoelectric sighting device;
2. simulating a simulated impact point through one of the above ballistic models;

In the case of applying the external ballistic 6-degree-of-freedom rigidity model to simulate the impact point, collecting information of the range-finder, environment information and angle information of a plurality of sensors, bullet-related data stored in a memory card, thereby simulating the impact point;

In the case of applying the low trajectory ballistic model to simulate the impact point, under a standard weather condition, the air density constant is 1, the sound speed is a constant, the resistance coefficient is a function of bullet speed, thereby simulating the impact point;

3. watching the field of view of a display screen of the photoelectric sighting device, adjusting the reticle, and making the reticle on the display screen in coincidence with the simulated impact point;
4. accomplishing automatic simulation and calibration.

As shown in FIGS. 13-16, the manual calibration comprises steps of:
1. setting a target 51 within a field of view 5 of the photoelectric sighting device, and measuring a distance from the photoelectric sighting device to the target 51 through a laser range-finder of the photoelectric sighting device;
2. invoking a plane coordinate 52 through an external key, loading the plane coordinate 52 on the display screen, a coordinate center 53 of the plane coordinate 52 coinciding with a reticle center;
3. watching the field of view 5 of the display screen of the photoelectric sighting device, and making the coordinate center 53 of the plane coordinate 52 in alignment and coincidence with the target within the field of view;
4. after alignment and coincidence, shooting a first bullet, and obtaining a first impact point 54 on the target, the display screen print-screening an image of the first impact point 54;
5. recording values of horizontal coordinate and longitudinal coordinate of the first impact point in the plane coordinate, e.g., $x_1$, $y_1$, and regulating the field of view of the display screen of the photoelectric sighting device; moving the horizontal coordinate direction by $-x_1$; moving the longitudinal coordinate direction by $-y_1$, such that the coordinate center 53 of the plane coordinate 52 coincides with the first impact point;
6. accomplishing calibration.

Before the first calibration shooting in the above embodiment, it always occurs that the first shooting deviates greatly, and the impact point does not fall within the target in the field of view. In order to avoid occurrence of the above condition, it is proposed in one embodiment of the present invention that through a ballistic model in the above embodiment, performing simulated shooting to the target in the field of view in step 1 to find a simulated impact point; then, performing automatic simulation and calibration based on the simulated impact point; then possibly selecting the first shooting calibration. This may guarantee that the impact point of the first shooting falls on the target.

According to the calibration method provided in the present embodiment, the core controller real-time receives the environment values collected by sensors, the distance from the gun sight to the sighted object measured by the laser range-finder, and bullet information provided by the memory. The ballistic model calculates a ballistic curve of the bullet based on the real-time varied environment values, consecutive non-discrete distance information, and bullet information, thereby obtaining a simulated impact point, and real-time applies the calculated impact point to determine and regulate a reticle, such that when the photoelectric sighting device sights any sighted object at a consecutive non-discrete distance under any environment, the reticle can be regulated in real time based on a ballistic curve calculation model, such that the reticle center is close to the actual impact point, thereby achieving an effect of non-polar reticle.

In one embodiment, after the first calibration shooting is completed, in order to further enhance the preciseness, a second shooting calibration may be performed, comprising steps of:

Steps 1-5 are identical to the above embodiment, thereby omitted here;

6. performing a second shooting to shoot a second bullet, obtaining a second impact point on the target, the display screen print-screening an image having the first impact point and the second impact point;

7. recording the numerical values of the horizontal coordinate and longitudinal coordinate of second impact point in the plane coordinate, e.g., $x_2$, $y_2$, and regulating the field of view of the display screen of the photoelectric sighting device; moving the horizontal coordinate direction by $-x_2$; moving the longitudinal coordinate direction by $-y_2$, such that the center of the plane coordinate coincides with the first impact point;

8. accomplishing calibration.

In one embodiment, the display screen print-screens an image by obtaining an instruction signal transmitted from the CPU core board, the memory card caches vibration parameters generated when a plurality of guns of various models shoot bullets. The vibration parameters may include: a vibration frequency, a vibration amplitude, and a vibration duration. The CPU core board may be connected to a sensor obtaining a vibration parameter. The sensor is a vibration sensor of a known technical kind. The obtained vibration parameters are matched with vibration parameters cached in the memory card. In the case of a successful match, it is confirmed as a shooting vibration; then the core control board sends a snapshot instruction signal to the display screen to control the display screen to snapshot.

The inventive calibration method performs coincidence of reticle center and impact point through specific shooting, and realizes precise calibration under current environment values; after calibrating by the calibration method and adopting the inventive method for indicating shooting in advance, shooting accuracy is further improved.

The invention claimed is:

1. A photoelectric sighting device, comprising:
a field-of-view obtaining unit for acquiring image information within a field of view of the sighting device;
a display unit for displaying reticle center and the image information acquired by the field-of-view obtaining unit;
a control unit for determining a target object in the image information and a target point of the target object while performing shooting indication in advance; and
a power supply for supplying power for the photoelectric sighting device, wherein the control unit comprises:
an image marginalization processing unit performs a marginalization processing to a three-frame image of a target object in the image information to obtain a marginalized image and to load the marginalized image on the display unit;
a target point acquisition unit that acquires the target point of the target object; and
a shooting advance indication unit that performs a shooting indication.

2. The photoelectric sighting device according to claim 1, wherein the target point acquisition unit determines the target point of the target object according to the marginalized image of the target object.

3. The photoelectric sighting device according to claim 2, wherein a circle with the target point as center and r as radius and s as area defines a shooting area, and an total area of the marginalized image of the target object is S, which satisfies $0.02 \leq s/S \leq 0.1$.

4. The photoelectric sighting device according to claim 3, further comprising a motion sensor disposed at a lower side of the field-of-view obtaining unit for collecting a motion direction of the field-of-view obtaining unit.

5. The photoelectric sighting device according to claim 4, wherein the shooting advance indication unit determines whether to indicate shooting based on a distance from a reticle center to the shooting area and a motion direction of the reticle center.

6. The photoelectric sighting device according to claim 5, wherein an shooting indication is provided when an angle $\alpha$ between the motion direction and an imaginary straight line connecting a sighting point and the target point is in a range of $-45° \leq \alpha \leq +45°$, and $L \leq r/2$, an shooting indication is provided, wherein L is a length of the imaginary straight line connecting the sighting point and the target point.

7. The photoelectric sighting device according to claim 1, wherein the sighting device comprises one or more sensors selected from the ground consisting of a wind speed wind direction sensor, a geomagnetic sensor, a temperature sensor, an air pressure sensor, and a humidity sensor.

8. The photoelectric sighting device according to claim 1, wherein the sighting device comprises a housing and a range finding unit for finding a range information from the target object to the photoelectric sighting device, and wherein the field-of-view obtaining unit, the display unit, the range finding unit are disposed in the housing.

9. The photoelectric sighting device according to claim 8, wherein the range finding unit comprises a signal emission end and a signal reception end; the field-of-view obtaining unit comprises an optical image acquisition end; the signal emission end, the signal reception end, and the optical image acquisition end are disposed at a front end of the housing; and the display unit is disposed at a rear end of the housing.

10. The photoelectric sighting device according to claim 9, wherein the signal emission end and the signal reception end are disposed above and symmetrically with respect to the optical image acquisition end.

11. The photoelectric sighting device according to claim 1, further comprising a housing, a first field-of-view adjustment unit disposed on the display unit, a second field-of-view adjustment unit disposed on the housing, and a third field-of-view unit connected to the housing; and
wherein the first field-of-view adjustment unit realizes field-of-view adjustment through a touch display screen, the second field-of-view regulating unit disposed on the housing comprises a plurality of keys; the third field-of-view regulating unit comprises an external slot affixed to the housing, an external connection line, and one or more external keys, the external keys being connected to the external slot through the external connection line.

12. The photoelectric sighting device according to claim 11, wherein the external connection line comprises a first end and a second end, wherein the first end is connected to the external slot, and the second end comprises one or more end branches, each of the one or more end branches being connected to one of the one or more external keys.

13. The photoelectric sighting device according to claim 12, wherein the external connection line comprises a secure clip.

14. The photoelectric sighting device according to claim 1, wherein the display unit further displays an ancillary shooting information and a work indication information.

15. The photoelectric sighting device according to claim 1, further comprises a wireless transmission device wirelessly connected to an external device and transmits signals wirelessly to the external device to be displayed on a display screen of the external device.

16. The photoelectric sighting device according to claim 1, further comprising an interface board and a core board, both a field-of-view drive circuit of the field-of-view obtaining unit and a range finding control circuit in a range finding unit are connected to the core board through the interface board, and a display drive circuit of the display unit is connected to the core board.

17. The photoelectric sighting device according to claim 16, wherein the core board has a memory card connected thereto, the memory card stores a bullet information database that contains an external ballistic 6-degree-of-freedom rigidity model and a ballistic model.

18. The photoelectric sighting device according to claim 17, wherein the photoelectric sighting device is adapted to perform an automatic simulated calibration that simulates an impact point using the external ballistic 6-degree-of-freedom rigidity model and the ballistic model and coincides a reticle with the simulated impact point.

19. The photoelectric sighting device according to claim 17, the external ballistic 6-degree-of-freedom rigidity model is adapted to receive one or more parameters selected from the group consisting of wind speed, wind direction, temperature, air pressure, humidity, longitude, latitude, and an elevation coordinate of a shooting point, initial velocity and direction of a bullet at a gun barrel outlet, a distance to the target object obtained through the range-finding unit, mass of the bullet, cross-section area of the bullet, mass eccentricity of the bullet, and resistance coefficient of the bullet.

20. The photoelectric sighting device according to claim 19, wherein, in the ballistic model, under a standard weather condition, air density function is 1, sound velocity is a constant, and the resistance coefficient is a function of bullet speed.

\* \* \* \* \*